(12) United States Patent
Matsuzaki

(10) Patent No.: US 6,250,439 B1
(45) Date of Patent: Jun. 26, 2001

(54) RADIAL-MOUNT TYPE DISK BRAKE

(75) Inventor: Yoshiki Matsuzaki, Itami (JP)

(73) Assignee: Sumitomo Electric Industries, Ltd., Hyogo (JP)

( * ) Notice: Subject to any disclaimer, the term of this patent is extended or adjusted under 35 U.S.C. 154(b) by 0 days.

(21) Appl. No.: 09/345,805

(22) Filed: Jul. 2, 1999

(30) Foreign Application Priority Data

Jul. 6, 1998 (JP) .................................................. 10-190517

(51) Int. Cl.$^7$ ...................................................... F16D 65/04
(52) U.S. Cl. ....................................... 188/73.31; 188/73.45
(58) Field of Search .............................. 188/73.1, 73.46, 188/73.47, 73.35, 73.36, 71.1, 73.34, 73.45, 370

(56) References Cited

U.S. PATENT DOCUMENTS

| | | | |
|---|---|---|---|
| Re. 29,582 | * 3/1978 | Brown | 188/73.3 |
| 2,399,010 | * 4/1946 | Eksergian et al. | 188/73 |
| 3,363,727 | * 1/1968 | Thirion | 188/73 |
| 3,933,226 | * 1/1976 | Maurice | 188/72.5 |
| 4,613,019 | * 9/1986 | Giorgetti | 188/73.31 |
| 5,217,093 | * 6/1993 | Carpenter | 188/73.45 |
| 5,735,368 | * 4/1998 | Kobayashi et al. | 188/73.39 |
| 6,068,091 | * 5/2000 | Finley | 188/73.31 |

FOREIGN PATENT DOCUMENTS

| | | |
|---|---|---|
| 2173268 | * 10/1986 | (GB) . |
| 62-177327 | * 4/1987 | (JP) . |
| 63-135623 | 6/1988 | (JP) . |
| 1210628 | 8/1989 | (JP) . |
| 7-12149 | 1/1995 | (JP) . |

OTHER PUBLICATIONS

An English Language abstract of JP 7–12149.

* cited by examiner

Primary Examiner—Robert J. Oberleitner
Assistant Examiner—Melody M. Burch
(74) Attorney, Agent, or Firm—Greenblum & Bernstein P.L.C.

(57) ABSTRACT

A radial-mount type disk brake has a caliper and mounting bolts mounted in bolt holes formed in the caliper with some clearance. It is desired to prevent the caliper from turning when braking torque acts thereon due to the clearances. The abutment surfaces of the caliper and the mounting member include surfaces perpendicular to the disk axis. By the binding action of the surfaces, it is possible to prevent pivoting of the caliper.

7 Claims, 6 Drawing Sheets

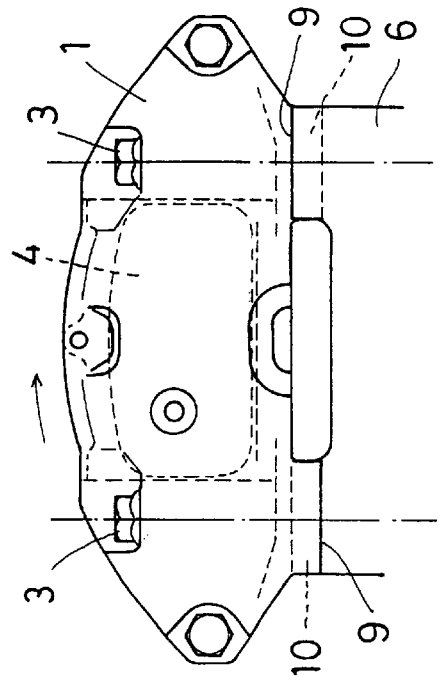
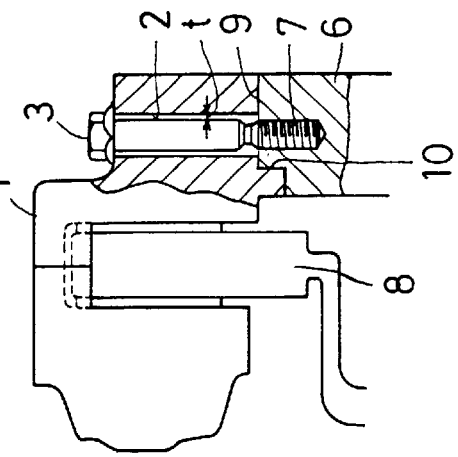
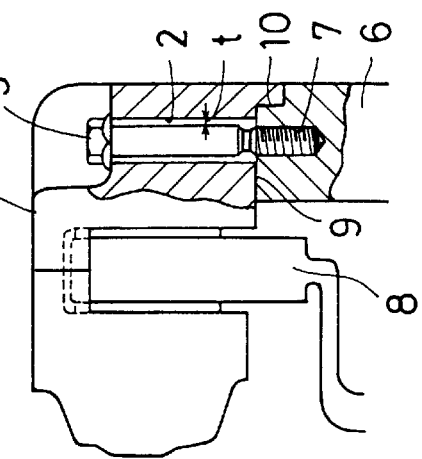
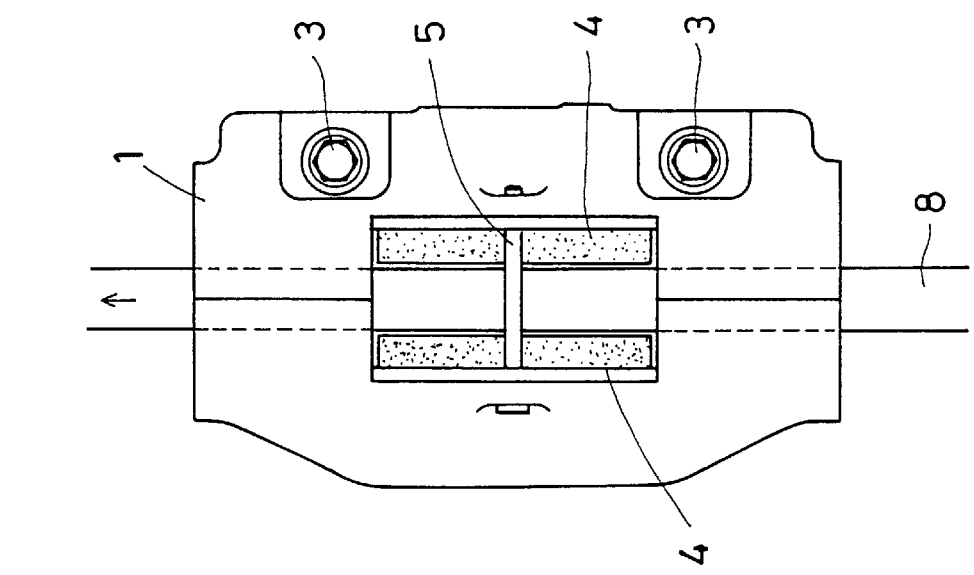
FIG. 1A
FIG. 1B
FIG. 1C
FIG. 1D

PRIOR ART FIG. 5
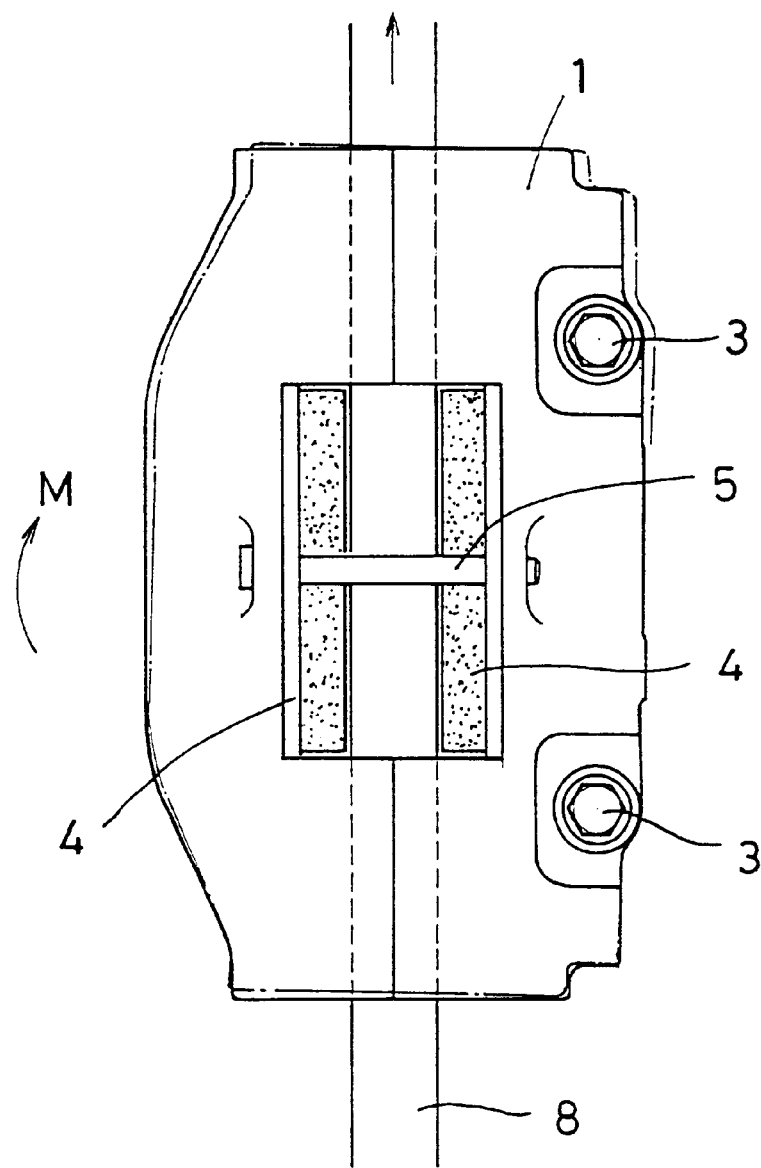

PRIOR ART FIG. 6
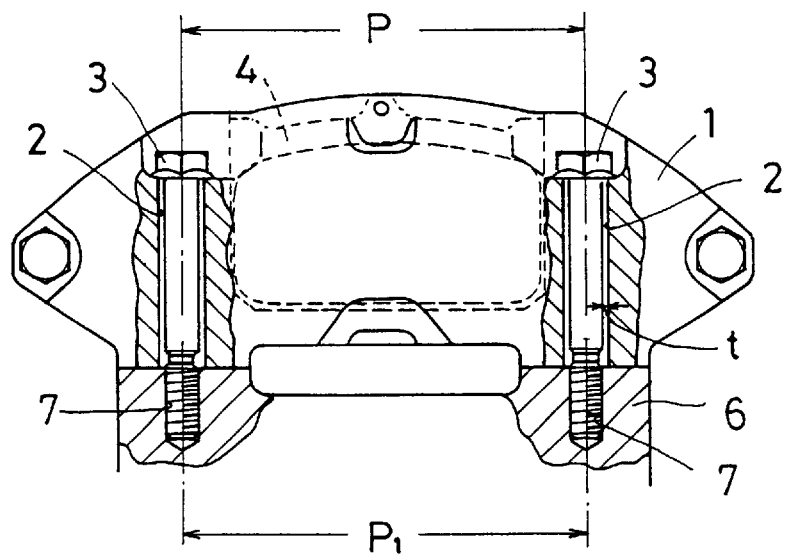
PRIOR ART FIG. 7
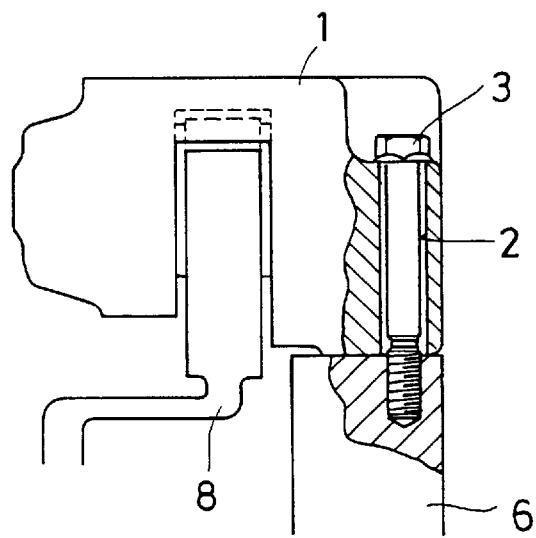

RADIAL-MOUNT TYPE DISK BRAKE

BACKGROUND OF THE INVENTION

This invention relates to a radial-mount type disk brake having its caliper fixed stably by improving the way in which the caliper is mounted.

A typical radial-mount type disk brake is shown in FIGS. 5–7. It has bolt holes 2 formed in the caliper 1 at its disk-leading (when the disk is rotating clockwise) and disk-trailing sides to extend perpendicularly to the disk axis. Mounting bolts 3 are inserted through the bolt holes 2 and threaded into a knuckle 6 to fix the caliper 1 to the knuckle 6. This mounting arrangement provides higher rigidity of the caliper than an ordinary mounting arrangement, in which the caliper 1 is tightened by bolts extending parallel to the disk axis.

Such radial-mount type disk brakes are disclosed in unexamined Japanese patent publications 63-135623, 1-210628 and 7-12149.

In the radial-mount arrangement, as shown in FIG. 6, clearances t are formed between the bolts 3 and the holes 2 to absorb any unavoidable discrepancy in the pitch P between the bolt holes 2, and the pitch P1 between the threaded holes 7 formed in the knuckle 6.

But with this arrangement, it is impossible to fix the caliper stably enough. When braking torque acts on the caliper 1, the caliper 1 tends to turn in the direction M in FIG. 5 by angular moment by a distance permitted by the clearances t as shown by chain line in FIG. 5, if the tightening force by the mounting bolts 3 are not enough. In the state shown by the chain line, the caliper mounting portion at the disk-leading side has moved toward the disk rotor 8, while the caliper mounting portion at the disk-trailing side has moved away from the disk rotor 8. Such dislocation of the caliper tends to deteriorate the braking performance, cause uneven wear of the pads 4, and increase the brake squeaks.

An object of this invention is to prevent turning of the caliper due to the clearances between the mounting bolts and the bolt holes.

SUMMARY OF THE INVENTION

According to this invention, there is provided a radial-mount type disk brake comprising a caliper, a disk rotor, a knuckle for supporting the caliper, the caliper being formed with bolt holes extending perpendicularly to the axis of a disk, and mounting bolts each inserted through the bolt holes and threaded into the knuckle to fix the caliper to the knuckle, characterized in that abutment surfaces of the caliper and the knuckle include at least one surface perpendicular to the axis of the disk.

The abutment surfaces perpendicular to the disk axis are preferably arranged such that the surface of the caliper at its disk-leading side faces an end face of the disk rotor, and the surface of the caliper at its disk-trailing side faces away from the disk. Also it is preferable to provide two or more of such perpendicular surfaces parallel to each other.

Such perpendicular surfaces may be formed on separate members (such as collars) mounted on the caliper.

Since the abutment surfaces of the caliper and the knuckle have surfaces perpendicular to the disk axis, pivoting of the caliper by the angular moment M in FIG. 5 is prevented by the binding action of these surfaces. Although this effect will reveal to the maximum if two or more of such perpendicular surfaces are provided parallel to each other, one can expect this effect anyhow by providing one of each such surface at the disk-leading and disk-trailing sides. But in the latter arrangement, the effect may lessen according to the positions of the surfaces. Therefore, in the latter arrangement, the surface positioning as shown in FIG. 1 is preferable.

Other features and objects of the present invention will become apparent from the following description made with reference to the accompanying drawings, in which:

BRIEF DESCRIPTION OF THE DRAWINGS

FIG. 1A is a plan view of a brake embodying the invention;

FIG. 1B is a back view of the same;

FIG. 1C is a partially cutaway side view of the same showing the caliper mounting portion at the disk-leading side;

FIG. 1D is a partially cutaway side view of the same showing the caliper mounting portion at the disk-trailing side;

FIG. 5 is a plan view of a conventional radial-mount type disk brake;

FIG. 6 is a back view of the brake of FIG. 5; and

FIG. 7 is a partially cutaway side view of the brake of FIG. 5 showing its caliper mounting portion.

DETAILED DESCRIPTION OF THE PREFERRED EMBODIMENT

Figure 2A:
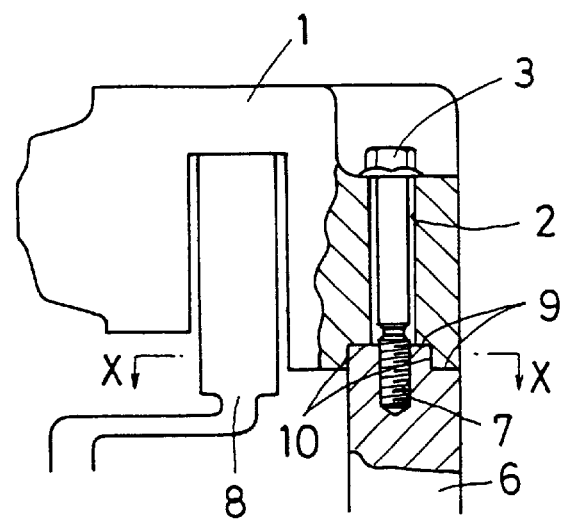
FIG. 2A is a partially cutaway side view of the caliper mounting portion of another embodiment.

FIG. 1 shows a disk brake embodying this invention. In the figure, numeral 1 designates a caliper. Bolt holes 2 are formed in the caliper 1 at its disk-leading and disk-trailing sides so as to extend perpendicularly to the axis of the disk to receive mounting bolts 3. Pads 4 hang from pad pins 5. Threaded holes 7 are formed in a knuckle 6. Numeral 8 is a disk rotor.

The pads 4 are biased by an unillustrated actuator mounted in the caliper 1. Clearances t (FIGS. 1C, 1D) are provided between the bolt holes 2 and the mounting bolts 3 to absorb any variation in the pitch between the bolt holes 2.

What has been described above is nothing different from the prior art. What distinguishes the illustrated disk brake over the prior art is the provision of surfaces 10 extending in a direction perpendicular to the axis of the disk so as to form steps or shoulders on the abutment surfaces between the caliper 1 and the knuckle 6 (see FIGS. 1B–1D).

In the embodiment of FIG. 1, one surface 10 is formed each at the disk-leading side and the disk-trailing side. The surface 10 at the disk-leading side is located farther from the disk rotor 8 than is the mounting bolt 3 as shown in FIG. 1C, while the surface 10 at the disk-trailing side is located between the disk rotor 8 and the mounting bolt 3 as shown in FIG. 1D. In other words the former surface faces toward the disk rotor 8 whereas the latter surface faces in the opposite direction to above.

But both of the surfaces 10 at the disk-leading and disk-trailing sides may be provided farther from or nearer to the disk rotor 8 than are the bolts 3. Even in this arrangement, it is possible to suppress the caliper's pivoting motion compared with the conventional arrangement in which the clearance allows pivoting of the caliper. In FIG. 1, two flat surfaces 10 are provided at the disk-leading and disk-trailing sides, respectively, so as to be parallel to each other. But one of them may be omitted. But in order to more positively prevent the caliper's pivoting motion, two flat surfaces should be provided as shown in FIG. 1.

Figure 2B:
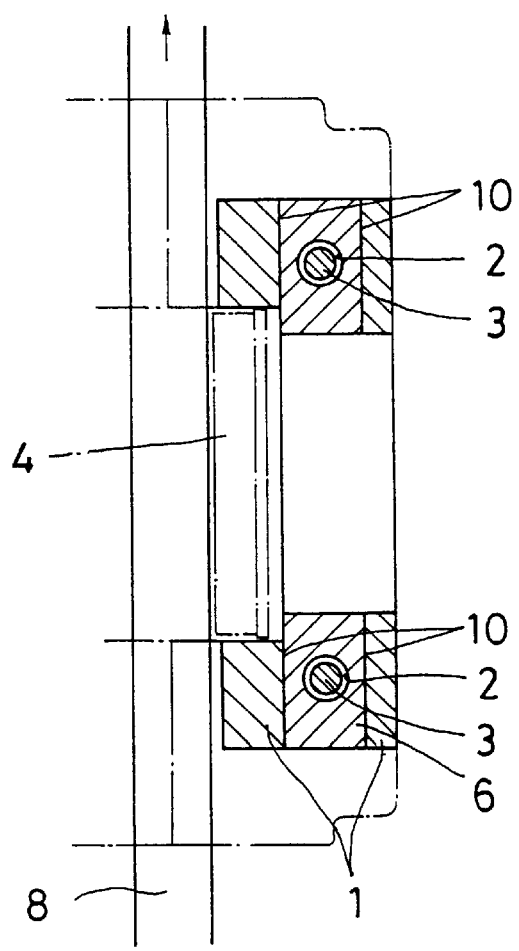
FIG. 2B is a sectional view taken along line X—X of FIG. 2A.
Figure 3A:
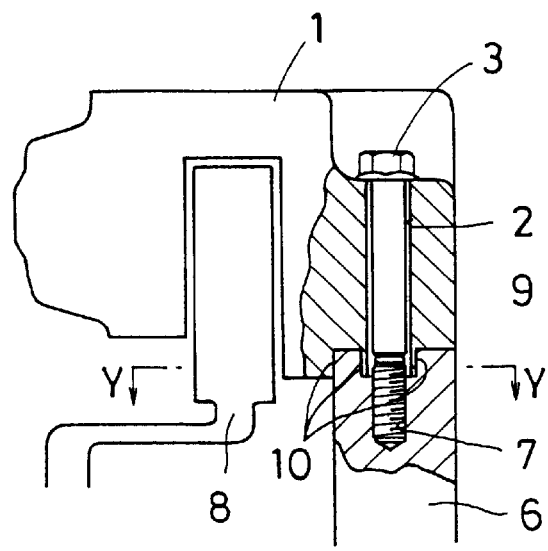
FIG. 3A is a partially cutaway side view of a further embodiment having three surfaces perpendicular to the disk axis.
Figure 3B:
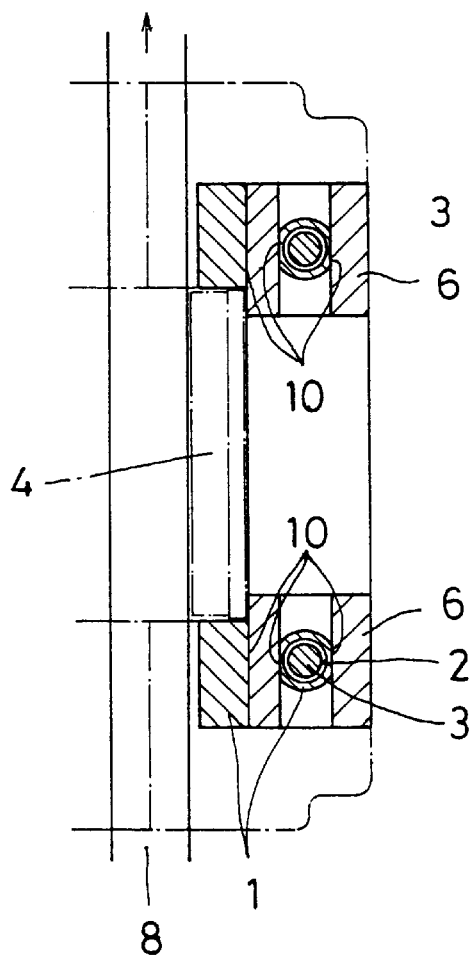
FIG. 3B is a sectional view taken along line Y—Y of FIG. 3A.

As shown in FIGS. 2 and 3, two or more parallel flat surfaces 10 may be formed to fit the caliper 1 and the knuckle 6 together in the radial direction of the disk. In this arrangement, the binding action of the surfaces 10 prevents the caliper 1 from pivoting due to braking torque, while the disk is rotating in either direction.

Figure 4A:
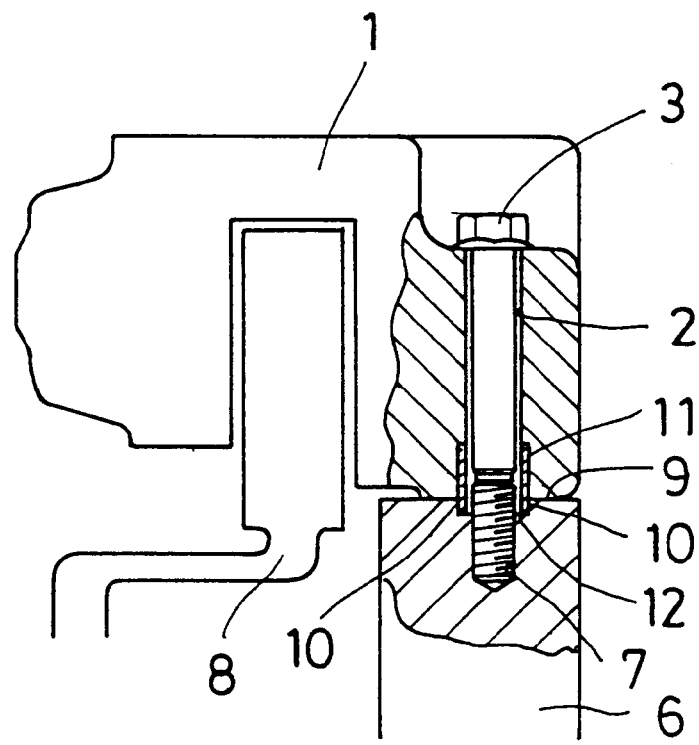
FIG. 4A is a partially cutaway side view of a still further embodiment in which a collar is used to prevent turning.
Figure 4B:
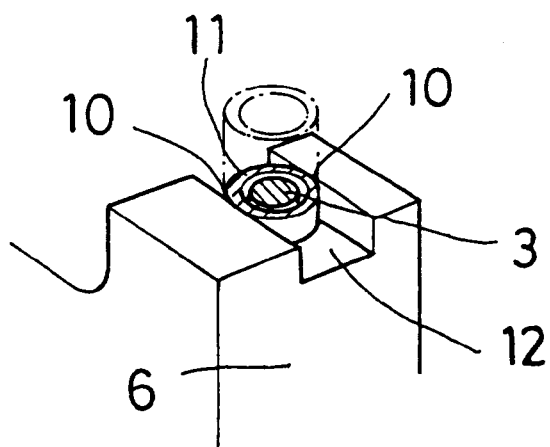
FIG. 4B is a perspective view of the collar received in the knuckle.

In the embodiment of FIG. 4, a collar 11 is inserted in one or both of the bolt holes 2 at its exit and its lower portion is received in a recess 12 formed in the knuckle 6 to prevent the caliper 1 from pivoting. In this case, the collar or collars 11 have to be of such a size that a suitable clearance is created between the collar and the mounting bolt 3.

If two such collars are used, the recesses 12 are preferably grooves extending parallel to the end face of the disk rotor 8 so that the bolts can be tightened even if the pitch between the recesses or the pitch between the collars should not coincide with each other (due to manufacturing error).

This invention is applicable to any types of the disk brake in which the pads are biased by a hydraulic, electric or manual actuator.

Also, this invention is applicable not only to the illustrated opposed-piston type but to the floating type.

As described above, according to this invention, abutment surfaces of the caliper and the knuckle include a surface perpendicular to the disk axis to prevent pivoting of the caliper resulting from the clearances between the bolt holes and the mounting bolts. By preventing pivoting of the caliper, it is possible to maintain braking performance, and suppress uneven wear of pads and squeaks.

Since the caliper can be prevented from pivoting without relying upon the mounting bolts, the bolt holes may have a greater diameter (and thus the clearances between the holes and the bolts may be greater) than before. This makes it possible to loosen the positional accuracy of bolt holes and threaded holes. Machining thus becomes easier.

What is claimed is:

1. A radial-mount type disk brake comprising a disk rotor having a rotational axis, a caliper having a transverse central axis parallel to said rotational axis of said disk rotor and leading and trailing ends with respect to the rotational direction of said disk rotor, a knuckle for supporting said caliper, said caliper being formed with bolt holes extending perpendicularly to said rotational axis of said disk rotor, and mounting bolts each inserted through one of said bolt holes and threaded into said knuckle, thereby fixing said caliper to said knuckle, said caliper being formed with first and second surfaces perpendicular to said rotational axis of said disk rotor at locations substantially offset toward said leading and trailing ends from said transverse central axis of said caliper, respectively, said knuckle being formed with third and fourth surfaces in abutment with said first and second surfaces of said caliper, respectively.

2. A radial-mount type disk brake comprising a disk rotor having a rotational axis, a caliper having disk-leading and disk-trailing sides with respect to the rotational direction of said disk rotor, a knuckle for supporting said caliper, said caliper being formed with bolt holes extending perpendicularly to said rotational axis of said disk rotor, mounting bolts each inserted through one of said bolt holes and threaded into said knuckle to fix said caliper to said knuckle, and abutment surfaces on said caliper and said knuckle including at least one abutment surface perpendicular to said rotational axis of said disk rotor, wherein said abutment surfaces of said caliper and said knuckle include two surfaces formed on said caliper perpendicularly to said rotational axis of said disk rotor at said disk-leading and disk-trailing sides, said surface at said disk-leading side facing toward said disk rotor, and said surface at said disk-trailing side facing away from said disk rotor.

3. A radial-mount type disk brake comprising a caliper, a disk rotor having a rotational axis, a knuckle for supporting said caliper, said caliper being formed with bolt holes extending perpendicularly to said rotational axis of said disk rotor, and mounting bolts each inserted through one of said bolt holes and threaded into said knuckle, thereby fixing said caliper to said knuckle, said caliper being formed with first and second surfaces perpendicular to said rotational axis of said disk rotor and arranged along a line parallel to said rotational axis of said disk rotor, said first surface facing toward said disk rotor and said second surface facing away from said disk rotor, said knuckle being formed with third and fourth surfaces in abutment with said first and second surfaces, respectively.

4. The radial-mount type disk brake of claim 1 wherein a collar is mounted at the exit of at least one of said bolt holes of said caliper for passing one of said mounting bolts with a predetermined clearance such that said collar protrudes from said caliper into said knuckle, wherein one of said first and second surfaces perpendicular to said disk rotor axis is formed by the outer peripheral surface of the protruding portion of said collar.

5. The radial-mount type disk brake as claimed in claim 3 wherein said first and second abutment surfaces are provided in juxtaposition with one of said mounting bolts.

6. The radial-mount type disk brake as claimed in claim 3 wherein said first and second abutment surfaces are provided in juxtaposition with each of said mounting bolts.

7. The radial-mount type disk brake as claimed in claim 3 wherein a collar is mounted at the exit of at least one of said bolt holes of said caliper for passing one of said mounting bolts with a predetermined clearance such that said collar protrudes from said caliper into said knuckle, wherein one of said first and second surfaces perpendicular to said rotational axis is formed by the outer peripheral surface of the protruding portion of said collar.

* * * * *

UNITED STATES PATENT AND TRADEMARK OFFICE
CERTIFICATE OF CORRECTION

PATENT NO. : 6,250,439 B1
DATED : June 26, 2001
INVENTOR(S) : Y. Matsuzaki

It is certified that error appears in the above-identified patent and that said Letters Patent is hereby corrected as shown below:

<u>Column 4,</u>
Line 43, "disk rotor" should be -- rotational --.

Signed and Sealed this

Fifteenth Day of January, 2002

Attest:

Attesting Officer

JAMES E. ROGAN
*Director of the United States Patent and Trademark Office*